March 10, 1931. H. F. WOLSTENHOLME 1,795,750
ROTARY INTERNAL COMBUSTION ENGINE
Filed Jan. 22, 1929 2 Sheets-Sheet 2
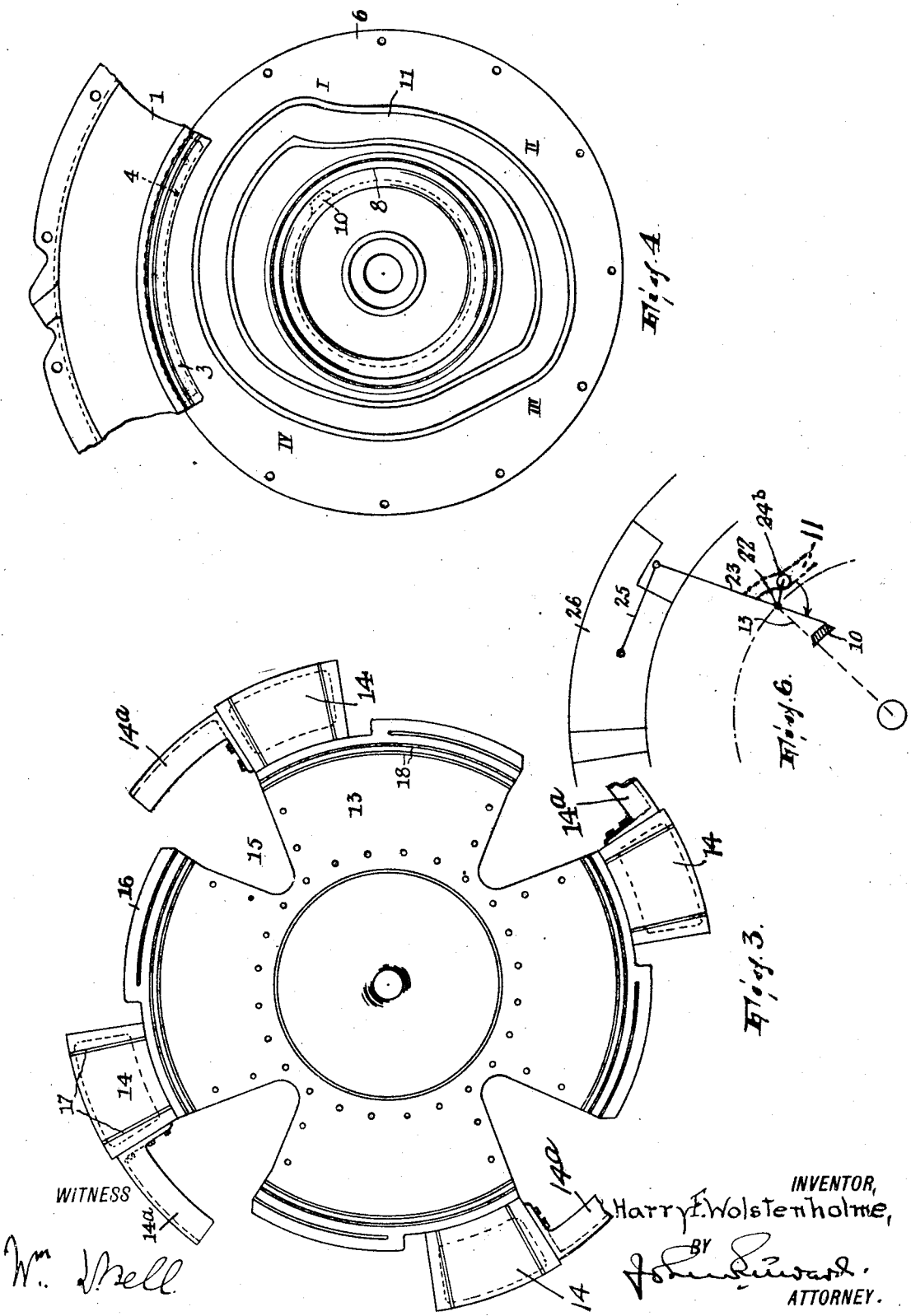
INVENTOR,
Harry F. Wolstenholme,
ATTORNEY.

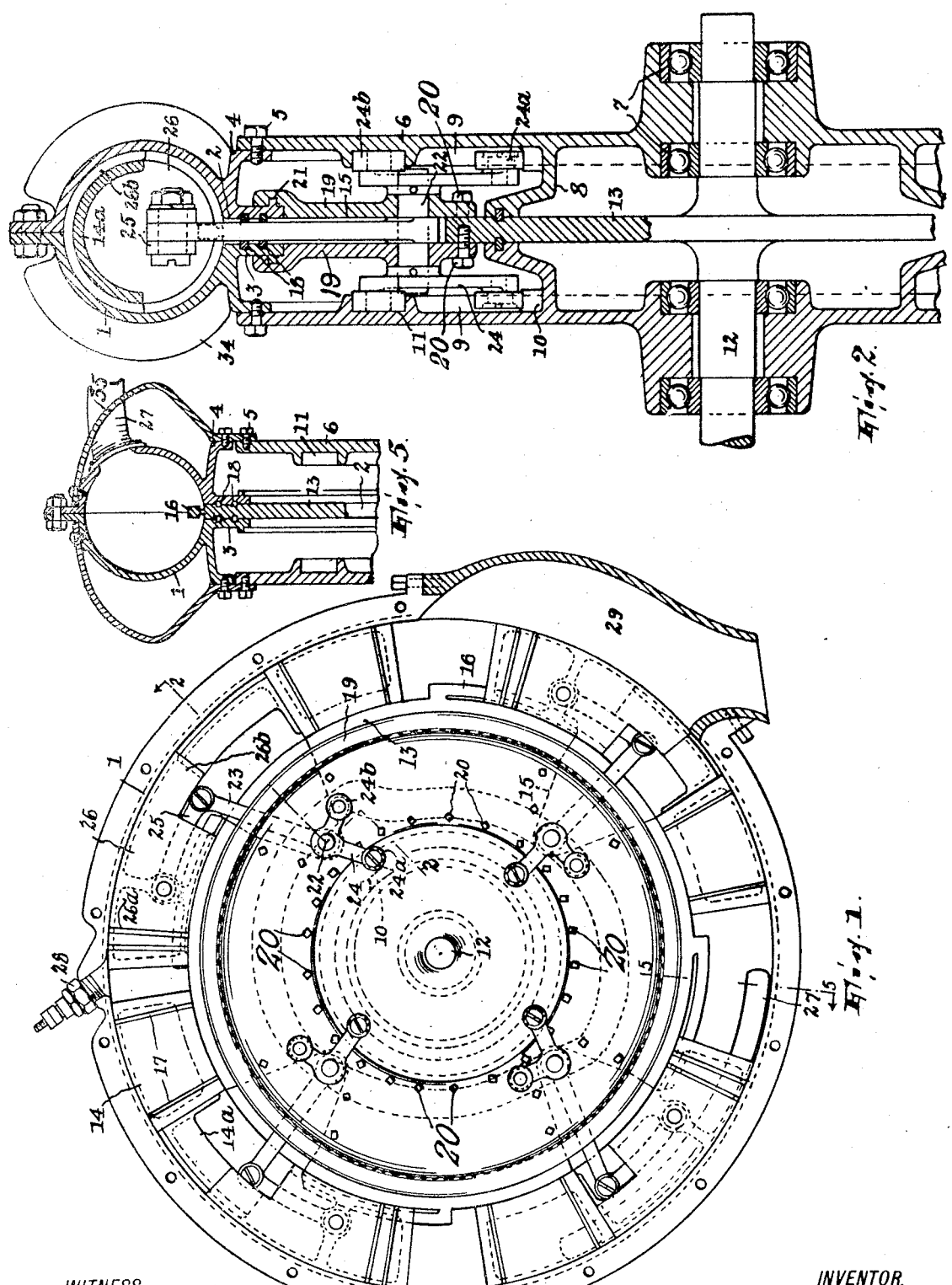

Patented Mar. 10, 1931

1,795,750

UNITED STATES PATENT OFFICE

HARRY F. WOLSTENHOLME, OF PATERSON, NEW JERSEY

ROTARY INTERNAL-COMBUSTION ENGINE

Application filed January 22, 1929. Serial No. 334,268.

This invention consists in an improved internal combustion engine in which the energy of the explosions is exerted upon a lever or levers fulcrumed in and moving with the rotor and adapted to obtain a working purchase upon some fixed part of the stator, for which purpose the rotor has a fixed piston or pistons, or rather what I hereinafter term an abutment or abutments, and its true piston is in effect the power-application portion or head of each lever, the abutments and heads forming with an annular cylindrical portion of the stator expansible and contractible spaces which are the working spaces of the engine. The principal object is to provide an engine of this type which shall have a high degree of efficiency, being capable of being operated with the minimum vibration, friction and other causes of energy-waste, and which may be light in weight, simple in construction and inexpensive to manufacture.

In the drawings,

Fig. 1 is a side elevation of the engine, with one half of the cylinder and the near head or wall 6 of the engine removed;

Fig. 2 is a fragmentary sectional view on substantially line 2—2, Fig. 1;

Fig. 3 shows in side elevation that part of the rotor which includes its disk and abutments;

Fig. 4 is a fragmentary inside elevation of one-half or section of the cylinder and the inner face of one of the heads 6;

Fig. 5 is a fragmentary sectional view on substantially the line 5—5, Fig. 1, showing a modification; and Fig. 6 is a diagram illustrating the operation of the engine.

An annular cylindrical shell 1 (comprising two semi-cylindrical portions bolted together—see Fig. 2) which forms the cylinder of the engine and has a continuous slot 2 at its inner periphery flanked by the inner inwardly projecting flanges 3 has outer angular inwardly projecting flanges 4 to which are secured by screws 5 the disk-like heads 6 which centrally thereof have bearings 7 for the shaft of the rotor; inward flanges 8 on the heads combine with the rotor as will appear to form between them and the cylinder and laterally bounded by the heads annular liquid-lubricant-receiving chambers 9. At their inner faces the heads have a hump 10 and they also have camways 11 to which reference will again be made. So much forms the stator of the engine.

Fixed in any way to rotate with the main shaft 12 journaled in the bearings 7 is the rotor disk 13 having (here four of) the mentioned abutments 14 which are cylindrical and fit the cylinder interiorly. The rotor rotates clockwise and immediately rearward of each abutment the disk of the rotor has segmental recesses 15, and immediately rearward of each such recess a peripheral arcuate rib 16. At 17 is shown packing between the abutment and cylinder and at 18 packing between the disk and the two flanges 3, which packing may be rings set in grooves in the parts in the well known way. Besides the disk 13, the rotor includes two annular cover plates 19 secured, as by screws 20, to the opposite faces of disk 13 and serving to close off the recesses 15 from the chamber 9; these plates overlap the flanges 3 (with each of which they may form a seal by the tongue-and-groove connection at 21), wherefore the recesses 15 become pockets open only outwardly or into the cylinder and the lubricant contained in chamber 9 is prevented from flooding the cylinder and being subject to the churning action of and interfering with the movements of certain parts movable on the rotor. From the rear end of each abutment 14 reaches a half-cylindrical extension or skirt 14a, only one of which is shown in Fig. 3 but all appearing in Fig. 1.

The mentioned levers here each comprise a rocker-shaft 22 journaled in the two plates 19 so as to traverse the mentioned pocket 15 at its inner extremity, a central arm 23 fixed to this shaft projecting between the plates into the cylinder, and a pair of angular arms 24 fixed to said shaft outward of the plates (or in the chambers 9), each such arm having rollers 24a, 24b; the rollers 24a are adapted to obtain a purchase on the hump 10 and the rollers 24b travel in the camways 11, as will appear. Arm 23 is pivotally connected by a link 25 with a piston 26 (having packing rings 26a) which in effect forms the power-application portion or head of the mentioned lever; this piston 26 has a forward semi-cylindrical skirt 26b lapping the skirt 14a of the abutment. Said piston has a groove to receive and be guided by the rib 16 of rotor disk 13.

At 27 is the intake in the cylinder for the explosion mixture; at 28 is a spark plug; and at 29 is the exhaust port. In each complete revolution of the rotor each of the motor units shown (here four in number and each comprising with the cylinder an abutment and a piston-headed lever) passes the firing, exhaust, intake and compression stages as usual. At the firing stage the rollers 24a reach the point where if the lever, then canted to its extreme limit in the anti-clockwise direction, is shifted toward its other limit said rollers must obtain a purchase on the hump 10; the firing occurring, this shifting results and an impulse is imparted to the rotor in the clockwise direction. The camways 11 are so formed as to permit this shifting of the lever, and then, acting on rollers 24b to shift the lever again counter-clockwise, to expel the burned gases at the exhaust, then clockwise to effect aspiration or intake of a fresh charge and finally anti-clockwise again to compress this charge. These four points in the camways are indicated in Fig. 4 more or less generally by the fall at I, the rise at II, the fall at III and the rise at IV, the fall at I being sudden so that the lever can act with maximum effect on the purchase hump 10. When the firing occurs the space between the abutment and piston-head of the lever is at its minimum capacity (top of Fig. 1), the charge being fully compressed. Of course the number of motor units and the number of groups of firing, exhaust, intake and compression stages there are in a single engine are immaterial. Fig. 6 shows, diagrammatically, a lever about to obtain its purchase on hump 10 on the explosion occurring.

The cooling of the cylinder may be by air, for which purpose the cylinder may have louvers 34, or by water, in which case suitably formed shells 35 may be secured by screws to the cylinder to provide a water jacket therefor (Fig. 5).

The operation insofar as propulsion of the rotor by the exploded charge is concerned simulates that occurring when a lever is used to move a load over a surface with the prime mover carried by the load, such lever corresponding to my piston-headed lever. The charge acts of course equally on both the piston abutment and the piston head, and in the example so that the lever acts to rotate the rotor by pulling efforts, as shown by Fig. 6.

Proper lubrication of the main operating parts is possible by the lubricant within the chamber 9. From this chamber by any conventional system of ports (not shown) lubricant may be distributed to the joints connecting the elements of the piston-headed levers.

If access is required to the parts for repairs or inspection this is readily possible by removing at one side or the other the head 6, then the cover plate of the rotor and finally (if necessary) one-half of the cylinder.

The purpose of the overlapping skirts on each piston head 26 and the piston abutment 14 next forward thereof or non-cooperative therewith is to exclude admission between them of the charge from the intake, which of course would impede the movements of the piston head.

In the engine as herein shown the revolving system of parts produces the exhaust and it also compresses the charge, but it will be understood that the invention does not depend on these matters, since the exhaust might be accomplished by independent means and the charge might be delivered to the engine already sufficiently compressed for effective explosion.

Having thus fully described my invention, what I claim is:

1. The combination of a stator including an annular cylinder having circumferentially offset intake and exhaust ports and an opening extending continuously of the annulus thereof, a rotor coaxial with and closing the opening of said annulus and thereby forming with the cylinder a closed space and having a piston abutment in the cylinder, a lever to impart rotary impulses to the rotor fulcrumed therein on an axis parallel with the axis thereof and having a piston head in the cylinder forming with the latter and the abutment an explosion chamber, said lever having a part thereof projecting exterior of said space and means to fire an explosive charge in said chamber after the latter reaches the intake but before it reaches the exhaust port, said stator having a purchase-affording means exterior of said space and with which said port of said lever coacts on the explosion and means to return the lever toward the abutment on each movement thereof from the same as an incident of such explosion.

2. The combination of a stator including an annular cylinder having circumferentially offset intake and exhaust ports and an opening extending continuously of the annulus thereof, a rotor coaxial with and closing the opening of said annulus and thereby forming with the cylinder a closed space and having a piston abutment in the cylinder, a lever to impart rotary pulling impulses to the rotor fulcrumed between its ends therein on an axis parallel with the axis thereof and having on one arm thereof a piston head in the cylinder arranged rotatively ahead of said abutment and forming therewith and with the cylinder an explosion chamber, said lever having another arm thereof projecting exterior of said space, and means to fire an explosive charge in said chamber after the latter reaches the intake but before it reaches the exhaust port, said stator having purchase-affording means exterior of said space and with which the other lever arm coacts on the explosion and means to return the lever toward the abutment on each movement thereof from the same as an incident of such explosion.

3. The combination of a stator including an annular cylinder having circumferentially offset intake and exhaust ports and an opening extending continuously of the annulus thereof, a rotor coaxial with and closing the opening of said annulus and having a piston abutment in the cylinder, a lever to impart rotary impulses to the rotor fulcrumed between its ends therein on an axis parallel with the axis thereof and having on one arm thereof a piston head in the cylinder forming therewith and with the abutment an explosion chamber, and means to fire an explosive charge in said chamber after the latter reaches the intake but before it reaches the exhaust port, said lever having its other arm projecting substantially oppositely to the first arm thereof and also a lateral arm and said stator having purchase-affording means with which said other lever arm coacts on the explosion and a guideway with which said lateral arm coacts to return the lever toward the abutment on each movement thereof from the same as an incident of such explosion.

4. The combination of a stator including an annular cylinder having circumferentially offset intake and exhaust ports and an opening extending continuously of the annulus thereof, a rotor coaxial with and closing the opening of said annulus and having a piston abutment in the cylinder and a pocket open at said opening into the cylinder and forming with the cylinder a closed space, a lever to impart rotary impulses to the rotor fulcrumed between its ends therein on an axis parallel with the axis thereof and having one arm in the pocket and the other exterior of said space and also having on the former arm a piston head in the cylinder forming with the latter and said abutment an explosion chamber, and means to fire an explosive charge in said chamber after the latter reaches the intake but before it reaches the exhaust port, said stator having exterior of said space a purchase-affording means with which said other lever arm coacts on the explosion and means engaging the lever thereupon to return the lever toward the abutment on each movement thereof from the same as an incident of such explosion.

5. The combination of a stator including an annular cylinder having circumferentially offset intake and exhaust ports and an opening extending continuously of the annulus thereof, a rotor coaxial with and closing the opening of said annulus and having a plurality of spaced piston abutments in the cylinder, a plurality of levers to impart rotary impulses to the rotor fulcrumed therein on axes parallel with the axis thereof and respectively having piston heads alterating with said abutments and forming therewith and with the cylinder a plurality of explosion chambers and spaces alternating with said chambers, each head and abutment separated by one such space having overlapping means to cut off said space from the intake when the latter is passed by such space, and means to fire an explosive charge in each chamber after the latter reaches the intake but before it reaches the exhaust port, said stator having purchase-affording means with which each lever coacts on each explosion and means to return each lever toward the abutment from which it moves as an incident of such explosion.

6. The combination of a stator including an annular cylinder having circumferentially offset intake and exhaust ports and an opening extending continuously of the annulus thereof, a rotor coaxial with and closing the opening of said annulus and thereby forming with the cylinder a closed space and having a piston abutment in the cylinder, said stator having a fixed portion forming with the rotor another closed space bounded by the cylinder annulus, a lever to impart rotary impulses to the rotor fulcrumed between its ends therein on an axis parallel with the axis thereof and having one arm in the first space and on said arm a piston head in the cylinder forming therewith and with said abutment an explosion chamber and its other arm in the second space, and means to fire an explosive charge in said chamber after the latter reaches the intake but before it reaches the exhaust port, said fixed portion having within said second space purchase-affording means with which said other lever arm coacts on the explosion and means to return the lever toward the abutment on each movement thereof from the same as an incident of such explosion.

7. The combination of a stator including an annular cylinder having circumferentially offset intake and exhaust ports and an opening extending continuously of the annulus thereof, a rotor coaxial with and closing the opening of said annulus and thereby forming with the cylinder a closed space and having a piston abutment in the cylinder, said stator having fixed portions forming another closed space bounded by the cylinder annulus and containing the rotor, a lever to impart rotary impulses to the rotor fulcrumed between its ends therein on an axis parallel with the axis thereof and having one arm in the first space and on said arm a piston head in the cylinder forming therewith and with said abutment an explosion chamber and its other arm divided and arranged in the second space with its divided portions separated by the rotor, and means to fire an explosive charge in said chamber after the latter reaches the intake but before it reaches the exhaust port, said fixed portions having within said second space purchase-affording means with which said portions of said other arm of the lever coact on the explosion and means to return the lever toward the abutment on each movement thereof from the same as an incident of such explosion.

In testimony whereof I affix my signature.

HARRY F. WOLSTENHOLME.